(12) United States Patent
Wang et al.

(10) Patent No.: US 11,043,024 B2
(45) Date of Patent: Jun. 22, 2021

(54) METHOD, APPARATUS, AND STORAGE MEDIUM FOR PROCESSING IMAGE IN A VIRTUAL REALITY SYSTEM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yakun Wang, Beijing (CN); Lin Lin, Beijing (CN); Jian Sun, Beijing (CN); Ziqiang Guo, Beijing (CN); Jiyang Shao, Beijing (CN); Binhua Sun, Beijing (CN); Feng Zi, Beijing (CN); Bingxin Liu, Beijing (CN); Yadong Ding, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/516,660

(22) Filed: Jul. 19, 2019

(65) Prior Publication Data

US 2020/0211269 A1 Jul. 2, 2020

(30) Foreign Application Priority Data

Jan. 2, 2019 (CN) .......................... 201910001464.7

(51) Int. Cl.
  *G06T 15/20* (2011.01)
  *G06T 19/00* (2011.01)
  *G06F 3/01* (2006.01)

(52) U.S. Cl.
  CPC ............ *G06T 15/205* (2013.01); *G06F 3/011* (2013.01); *G06T 19/003* (2013.01)

(58) Field of Classification Search
  CPC ...... G06T 15/205; G06T 19/003; G05F 3/011
  See application file for complete search history.

(56) References Cited

U.S. PATENT DOCUMENTS

| | | | |
|---|---|---|---|
| 9,940,858 B2* | 4/2018 | Oravainen | G09G 5/363 |
| 2009/0115798 A1* | 5/2009 | Shimada | G09G 5/346 |
| | | | 345/621 |
| 2016/0364904 A1* | 12/2016 | Parker | G06F 3/038 |
| 2017/0287097 A1* | 10/2017 | Chen | G06T 19/006 |
| 2018/0268511 A1* | 9/2018 | Sorbo | G06F 3/011 |
| 2019/0281279 A1* | 9/2019 | Peuhkurinen | H04N 9/3194 |

* cited by examiner

*Primary Examiner* — Haixia Du
(74) *Attorney, Agent, or Firm* — The Webb Law Firm (57) ABSTRACT

The present application discloses a method, apparatus, and storage medium for processing an image in a virtual reality system. The method comprises: splitting an image to be rendered at a first timing in the virtual reality system into a first region and a second region; rendering the first region of the image to be rendered according to first gesture data of a user at the first timing; rendering the second region of the image to be rendered according to second gesture data at a second timing at the end of the rendering of the first region.

12 Claims, 8 Drawing Sheets

METHOD, APPARATUS, AND STORAGE MEDIUM FOR PROCESSING IMAGE IN A VIRTUAL REALITY SYSTEM

CROSS-REFERENCE TO RELATED APPLICATIONS

The present application claims priority to Chinese Patent Application No. 201910001464.7, filed on Jan. 2, 2019, which is incorporated herein by reference and used for all purpose.

TECHNICAL FIELD

The present application relates to a method, apparatus, and storage medium for processing an image in a virtual reality system.

BACKGROUND

With the rapid development of Virtual Reality (VR) technology, VR devices have gradually entered the people's field of vision, and are getting more and more applications. However, in practical applications, VR devices have a certain delay in sensing human body movements, so that an image viewed on a VR device by a user is not synchronized with the body movement of the user, which is liable to cause human discomfort.

Therefore, there is a need for providing a technology for improving image processing of VR devices.

SUMMARY

In an aspect of the present disclosure, there is provided a method for processing an image in a virtual reality system, comprising: splitting an image to be rendered at a first timing in the virtual reality system into a first region and a second region; rendering the first region of the image to be rendered according to first gesture data of a user at the first timing; and rendering the second region of the image to be rendered according to second gesture data at a second timing at the end of the rendering of the first region.

In an example, the first timing is a timing at which a vertical sync signal is generated in the virtual reality system.

In an example, the method further comprises: after rendering the second region of the image to be rendered, performing a TimeWarp process on an image corresponding to the first region as rendered and an image corresponding to the second region as rendered.

In an example, rendering the first region of the image to be rendered comprises rendering the first region with a first resolution; rendering the second region of the image to be rendered comprises rendering the second region with a second resolution; and the first resolution is lower than the second resolution.

In an example, splitting an image to be rendered at a first timing in the virtual reality system into a first region and a second region comprises: performing subject recognition on the image to be rendered at the first timing to determine a region in the image to be rendered at which a subject is located; and determining the region in the image to be rendered at which the subject is located as the second region.

In an example, splitting an image to be rendered at a first timing in the virtual reality system into a first region and a second region comprises: performing subject recognition on the image to be rendered at the first timing to determine a region in the image to be rendered at which a subject is located; and determining the region in the image to be rendered at which the subject is located as the second region.

In an example, splitting an image to be rendered at a first timing in the virtual reality system into a first region and a second region comprises: determining a gaze point location of the user at the first timing as a reference point position of the second region; and determining the second region according to a preset extension mode and the reference point position.

In an example, splitting an image to be rendered at a first timing in the virtual reality system into a first region and a second region comprises: determining a gaze point location of the user at the first timing as a reference point position of the second region; and determining the second region according to a preset extension mode and the reference point position.

In an example, splitting an image to be rendered in the virtual reality system into a first region and a second region comprises: determining a field of view of the user according to a distance between a current gaze point location of the user and a current location of the user; and determining the second region according to the field of view of the user and the current gaze point location.

In an example, the method further comprises: before rendering the second region of the image to be rendered, determining that a duration of rendering of the first region is less than a first threshold.

In an example, the method further comprising: before rendering the second region of the image to be rendered, determining that a distance between a gaze point location corresponding to the second gesture data and a gaze point location at the first timing is less than a second threshold.

In another aspect of the present disclosure, there is provided an apparatus for processing an image in a virtual reality system, comprising: a central processing unit configured to split an image to be rendered at a first timing in the virtual reality system into a first region and a second region; a graphics processing unit configured to: render the first region of the image to be rendered according to first gesture data of a user at the first timing; and render the second region of the image to be rendered according to second gesture data at a second timing at the end of the rendering of the first region.

In an example, the graphics processing unit is further configured to: perform a TimeWarp process on an image corresponding to the first region as rendered and an image corresponding to the second region as rendered after rendering the second region of the image to be rendered.

In an example, in order to render the first region of the image to be rendered, the graphics processing unit is configured to render the first region with a first resolution; in order to render the second region of the image to be rendered, the graphics processing unit is further configured to render the second region with a second resolution; and the first resolution is lower than the second resolution.

In an example, in order to split an image to be rendered at a first timing in the virtual reality system into a first region and a second region, the central processing unit is further configured to: perform subject recognition on the image to be rendered at the first timing to determine a region in the image to be rendered at which a subject is located; and determine the region in the image to be rendered at which the subject is located as the second region.

In an example, in order to split an image to be rendered at a first timing in the virtual reality system into a first region and a second region, the central processing unit is further configured to: determine a gaze point location of the user at the first timing as a reference point position of the second region; and determine the second region according to a preset extension mode and the reference point position.

In an example, in order to split an image to be rendered in the virtual reality system into a first region and a second region, the central processing unit is further configured to: determine a field of view of the user according to a distance between a current gaze point location of the user and a current location of the user; and determine the second region according to the field of view of the user and the current gaze point location.

In an example, the central processing unit is further configured to: before rendering the second region of the image to be rendered, determine that a duration of rendering of the first region is less than a first threshold.

In an example, the central processing unit is further configured to: before rendering the second region of the image to be rendered, determine that a distance between a gaze point location corresponding to the second gesture data and a gaze point location at the first timing is less than a second threshold.

In yet another aspect of the present disclosure, there is provided a computer-readable storage medium on which a computer program is stored, which when executed by a processor caused the processor to: split an image to be rendered at a first timing in the virtual reality system into a first region and a second region; render the first region of the image to be rendered according to first gesture data of a user at the first timing; and render the second region of the image to be rendered according to second gesture data at a second timing at the end of the rendering of the first region.

Additional aspects and advantages of the present application will partly be presented in the following description, partly become apparent in the following description or be appreciated in practicing of the present application.

BRIEF DESCRIPTION OF THE DRAWINGS

The above and/or additional aspects and advantages of the present disclosure will become apparent or easy to understand from the following detailed description taken in conjunction with the accompanying drawings, wherein.

DETAILED DESCRIPTION

A detailed description of embodiments of the present application will be given below. Illustrative embodiments are shown in the drawings, in which the similar reference signs are used throughout to represent the same or similar elements or elements having the same or similar functions. The embodiments described with reference to the drawings are illustrative, which are merely used to interpret the present application, but cannot be understood as limitation to the present application.

In view of the problem of causing discomfort by out-of-synchronization between an image viewed by a human on a VR device and a body movement of the human body in the related art, an embodiment of the present application provides a method for processing an image in a VR system.

In the embodiment of the present application, an image to be rendered at a first timing in the VR system is split into a first region and a second region; the first region of the image to be rendered is rendered according to first gesture data at the first timing; and the second region of the image to be rendered is rendered according to second gesture data at a second timing at the end of the rendering of the first region to obtain a rendered image. Therefore, by using gesture data at different timings, time-division rendering is performed on different regions of the image to obtain a rendered image. Therefore, the time interval between a timing at which the rendered image is displayed and a timing at which the gesture data is collected for rendering is shortened as much as possible, which effectively reduces the delay of the image and improves the user experience.

In order to illustrate the embodiment of the present application more clearly, description will be given below for the source of delay present in the VR system of a VR device that senses a human movement to display a corresponding image.

Figure 1:
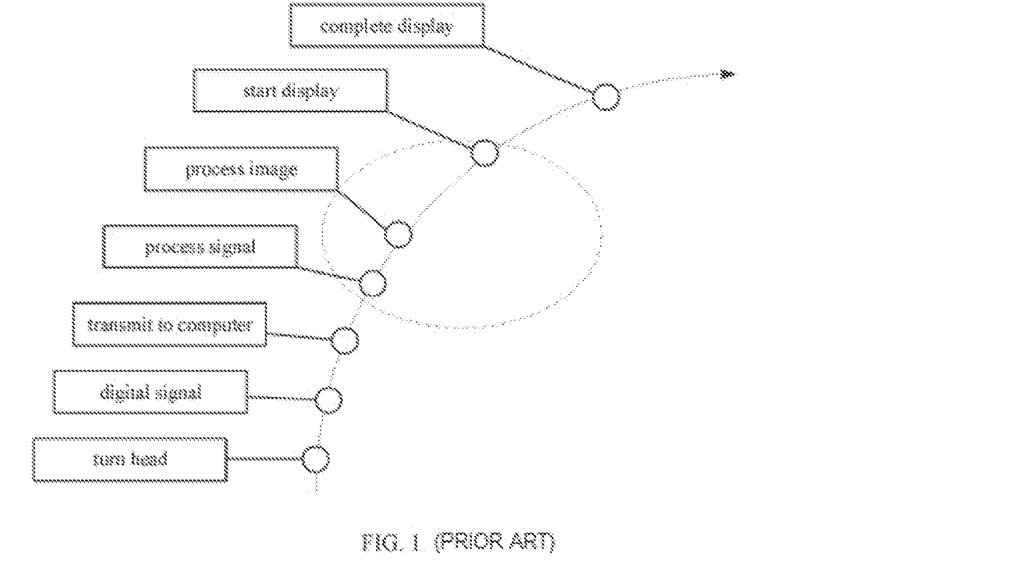
FIG. 1 is a schematic diagram of a process in which a virtual reality device displays a corresponding image according to a user movement in the related art.

As shown in FIG. 1, when the user turns his/her head, the VR device generates a corresponding digital signal according to first gesture of the head rotation of the user, and transmits the corresponding digital signal to a processing terminal (for example, a computer terminal). Thereafter, the processing terminal processes the signal to generate an image corresponding to the head gesture, and then displays the processed image to the user until the display is completed, however at this time the gesture of the user's head may not be identical with the first gesture. Since the processing of each of the above steps requires a certain amount of time, and the user's head may be in continuous rotation, the displayed image viewed at a certain gesture to which the head rotates is actually an image corresponding to a gesture at a previous timing.

In order to reduce the delay in a VR device, an embodiment of the present application reduces out-of-synchronization between displaying of an image in the VR device and a user movement (which otherwise may cause discomfort of the human body) by a process shown in the dotted portion of FIG. 1.

The method, apparatus and storage medium for processing an image in a VR system of embodiments of the present application will be described in detail below with reference to the accompanying drawings.

A method for processing an image in a VR system of the present application will be described with reference to FIG. 2.

Figure 2:
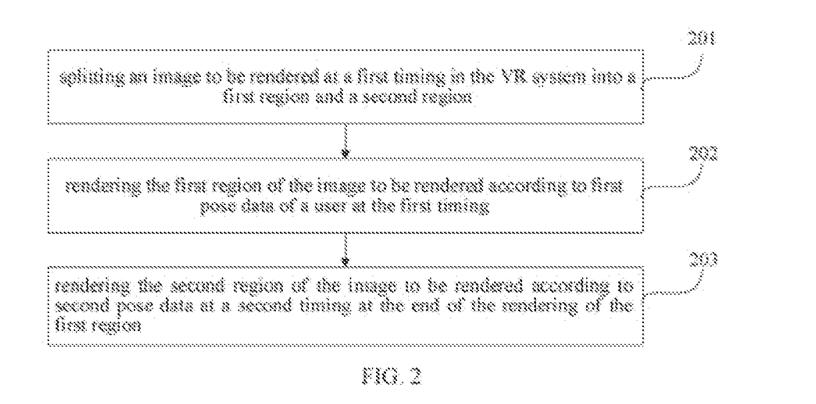
FIG. 2 is a schematic flowchart of a method for processing an image in a virtual reality system according to an embodiment of the present application.

FIG. 2 is a schematic flowchart of a method for processing an image in a VR system according to an embodiment of the present application.

As shown in FIG. 2, the method for processing an image in a VR system according to this embodiment of the present application comprises the following steps.

At step 201, an image to be rendered at a first timing in the VR system is split into a first region and a second region.

The method for processing an image in a VR system provided by this embodiment of the present application can be implemented by an apparatus for processing an image in a VR system provided by an embodiment of the present application. An apparatus for processing an image in a VR system is provided in an image processing device of the VR system to control image processing in the VR system. The image processing device of the VR system of this embodiment may be, but not limited to, VR glasses, a VR helmet, etc.

In the present embodiment, a first timing refers to a timing at which a vertical synchronization signal is generated in the VR system. Accordingly, an image to be rendered refers to an image the rendering of which is started as indicated by the timing of the vertical synchronization signal, and is also an image the displaying of which is indicated by a next vertical synchronization signal.

In the embodiment of the present application, the image to be rendered can be split into a first region and a second region in multiple manners. For example, the image may be split into a region of interest (the second region) and a region of non-interest (the first region) according to the gaze point of the user; alternatively, the image may be split into a subject region (the second region) and a background region (the first region) according to a subject in the image to be rendered, which is not specifically limited in the present embodiment.

How to split a current image to be rendered in the VR system into a first region and a second region will be described later.

At step 202, the first region of the image to be rendered is rendered according to first gesture data of a user at the first timing.

In this embodiment, after splitting the image to be rendered at the first timing in the VR system into a first region and a second region, the apparatus for processing an image in the VR system may control a gesture sensor to collect gesture data at the first timing that is, first gesture data of the current user of the VR system at the first timing is collected and is used to render the first region of the image to be rendered.

As an implementation, rendering the first region of the image to be rendered in the present embodiment includes, for example, determining, according to the user gesture data at the first timing and gesture data items corresponding to various image contents in a preset image library, content to be presented in the image to be rendered, and then rendering an image corresponding to the first region based on the content to be presented.

At step 203, the second region of the image to be rendered is rendered according to second gesture data at a second timing at the end of the rendering of the first region.

In an example, when rendering the second region of the image to be rendered, the apparatus for processing an image in the VR system may control the gesture sensor to collect gesture data at a second timing at the end of the rendering of the first region, that is, second gesture data of the current user of the VR system at a second timing is collected and is used to render the second region of the image to be rendered, so as to obtain a rendered image.

According to the gesture data (second gesture data) of the user at the second timing and correspondence between preset image contents and gesture data items, this embodiment can determine content to be presented in the image to be rendered, and then an image corresponding to the second region is rendered based on the content to be presented.

It should be noted that the refresh frequency of screens is generally between 60 Hz and 120 Hz, and the sampling frequency of the gesture sensor when collecting the first gesture data and the second gesture data of the user in the present application may be 1000 Hz. It can be seen that the refresh rate of the screen is much lower than the sampling frequency of the gesture sensor. Therefore, with the solution of the present application, a plurality of user gesture data items at different timings can be acquired in the process of rendering an image, the second region can be rendered by using a gesture data item as close as possible to the display timing, as a result the rendered image can be as close as possible to the gesture data of the user at display timing, thereby reducing the delay of the image.

Further, in this embodiment, the first region is rendered according to the first gesture data of the user, the second region is rendered according to the second gesture data of the user, and the first region and the second region may be rendered with the same resolution. Alternatively, the first region and the second region may be rendered with different resolutions.

In an actual application, in order to improve the processing speed of the image to be rendered and reduce the image processing time, the first region and the second region of the image to be rendered may be rendered with different resolutions.

For example, the first region is rendered with a lower resolution, and the second region is rendered with a resolution higher than the resolution of the first region, thereby ensuring high-precision rendering processing for the second region of the image. The rendered second region is more realistic and stereoscopic, and the rendering effect of the image is improved. Through reducing the rendering resolution of the first region, the rendering processing time of the first region can be reduced, so that the processing speed of the image can be improved and the needs of the user can be satisfied.

In an embodiment of the present application, rendering the first region of the image to be rendered comprises rendering the first region with a first resolution; rendering the second region of the image to be rendered comprises rendering the second region with a second resolution; wherein the first resolution is lower than the second resolution.

In the method for processing an image in a VR system provided in this embodiment of the present application, an image to be rendered at a first timing in the VR system is split into a first region and a second region; the first region of the image to be rendered is rendered according to first gesture data at the first timing; and the second region of the image to be rendered is rendered according to second gesture data at a second timing at the end of the rendering of the first region to obtain a rendered image. Therefore, by using gesture data at different timings, time-division rendering is performed on different regions of the image to obtain a rendered image. Therefore, the time interval between a timing at which the rendered image is displayed and a timing at which the gesture data is collected for rendering is shortened as much as possible, which effectively reduces the delay of the image and improves the user experience.

As known from the above, in the embodiment of the present application, the image to be rendered can be split into a first region and a second region in multiple manners.

When the image is split according to a location in the image to be rendered at which a subject is located, the first region is a background region, and the second region is the region at which the subject is located. Since the region at which the subject is located is usually a region that the user is interested in, when the region at which the subject is located is rendered, the rendering is based on gesture data closest to the display timing, so that the delay of the region at which the subject is located in the rendered image is effectively reduced, and the user experience is improved.

Figure 3:
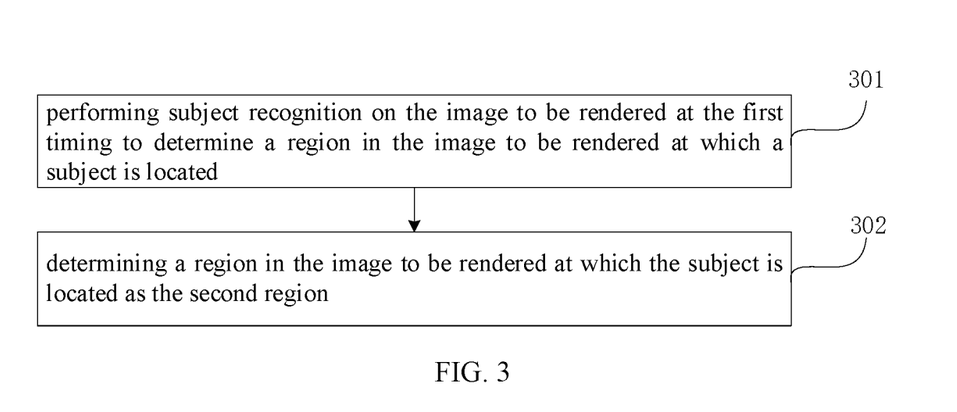
FIG. 3 is a schematic flowchart of splitting an image to be rendered at a first timing into a first region and a second region according to a location of a subject in the image to be rendered according to an embodiment of the present application.

Referring to FIG. 3, a description is given of splitting an image to be rendered at a first timing in the VR system into a first region and a second region according to a location in the image to be rendered at which a subject is located according to an embodiment of the present application.

As shown in FIG. 3, splitting an image to be rendered at a first timing in the VR system into a first region and a second region according to an embodiment of the present application comprises the following steps.

At step 301, subject recognition is performed on the image to be rendered at the first timing to determine a region in the image to be rendered at which a subject is located.

At step 302, a region in the image to be rendered at which the subject is located is determined as the second region.

In an actual application, a subject in the image is usually a region that the user is more interested in. Therefore, the present embodiment can perform subject recognition on the image to be rendered at a first timing to determine the region in the image to be rendered at which the subject is located. The region at which the subject is located is determined as the second region (region of interest), and a region other than the region at which the subject is located is determined as the first region (region of non-interest).

In this embodiment, the determination of a region at which the subject is located in the image to be rendered can be implemented by using an existing determination method, which will not be described herein.

Figure 4:
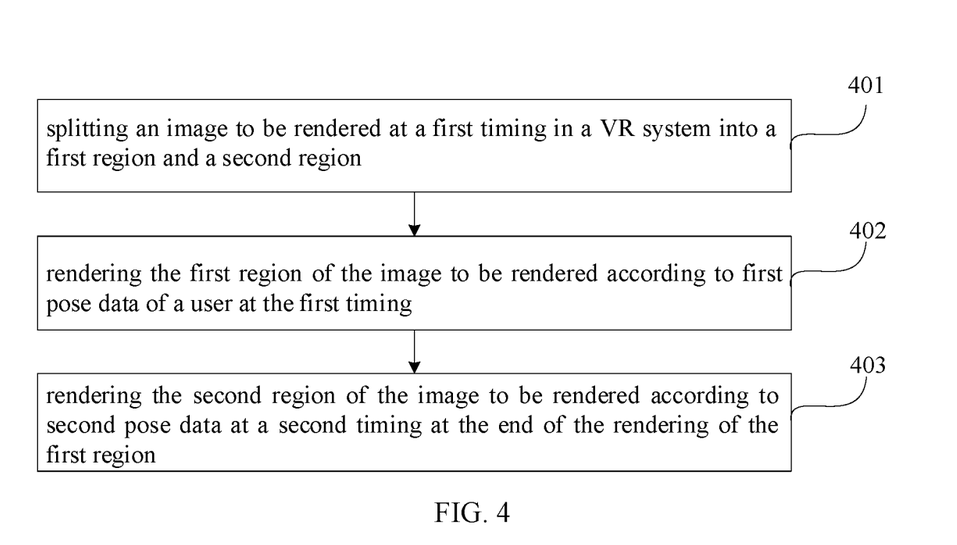
FIG. 4 is a schematic flowchart of a method for processing an image in a virtual reality system according to another embodiment of the present application.

Further, in this embodiment, an image to be rendered at a first timing in a VR system may be split into a first region and a second region according to a gaze point of the user. Referring to FIG. 4, a description is given of splitting an image to be rendered into a first region and a second region based on a gaze point.

FIG. 4 is a schematic flowchart of a method for processing an image in a VR system according to another embodiment of the present application. As shown in FIG. 4, the method for processing an image in a VR system according to this embodiment of the present application comprises the following steps.

At step 401, an image to be rendered at a first timing in a VR system is split into a first region and a second region.

Figure 5:
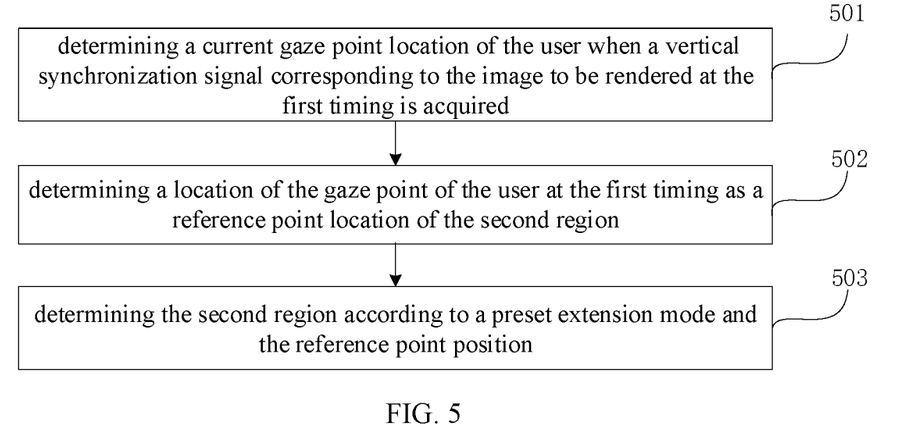
FIG. 5 is a schematic flowchart of splitting an image to be rendered at a first timing into a first region and a second region according to a location of the gaze point of a user according to an embodiment of the present application.
Figure 6:
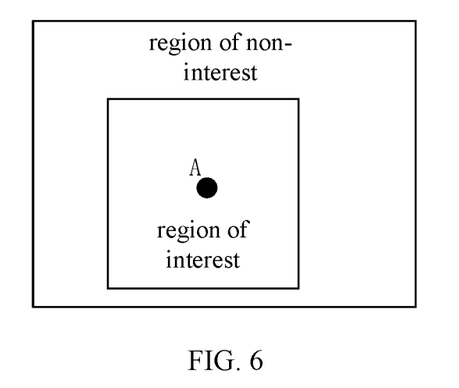
FIG. 6 is a diagram of splitting an image to be rendered at a first timing into a first region and a second region according to a location of the gaze point of a user according to an embodiment of the present application.
Figure 7:
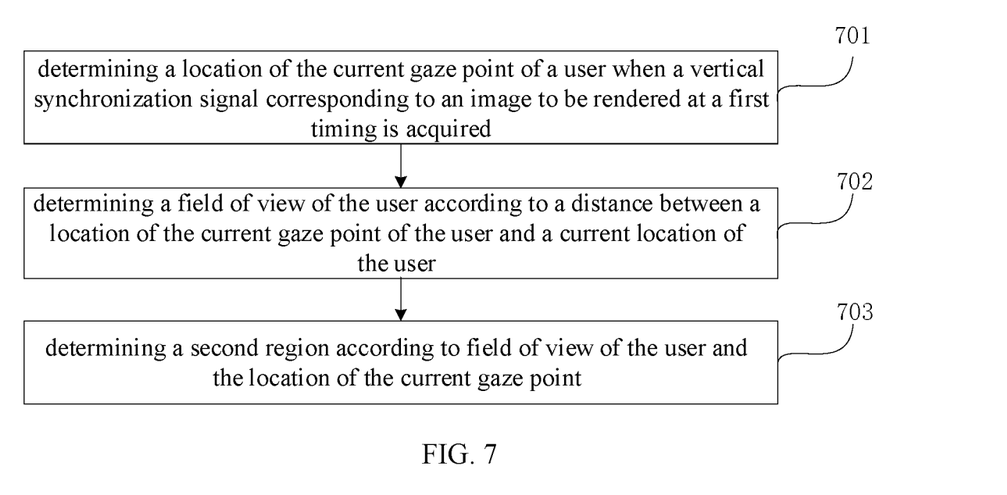
FIG. 7 is a schematic flowchart of splitting an image to be rendered at a first timing into a first region and a second region according to a location of the gaze point of a user according to another embodiment of the present application.

Referring to FIGS. 5 to 7, in the embodiment of the present application, the image to be rendered at a first timing can be split into a first region and a second region in multiple manners.

Referring to FIGS. 5 to 7, a description is given of splitting an image to be rendered at a first timing in a VR system into a first region and a second region according to a gaze point of a user according to an embodiment of the present application.

As shown in FIG. 5, splitting an image to be rendered at a first timing in a VR system into a first region and a second region according to an embodiment of the present application comprises the following steps.

At step 501, when a vertical synchronization signal corresponding to the image to be rendered at the first timing is acquired, a current gaze point location of the user is determined.

At step 502, the gaze point location of the user at the first timing is determined as a reference point location of the second region.

At step 503, the second region is determined according to a preset extension mode and the reference point position.

The preset extension mode may be predetermined, or may be determined according to the field of view of the user, which is not limited herein.

In an example, the present embodiment can monitor a vertical synchronization (Vsync) signal in real time, and when the Vsync signal is detected at a first timing, acquire a gaze point location of human eyes at the first timing, and then split an image to be rendered in the VR system into a first region and a second region according to the gaze point location of human eyes at the first timing (corresponding to a first gesture). To obtain a gaze point location of human eyes at a first timing, it may be performed by eyeball tracking to track a change of an eyeball or features around the eyeball; or it may be achieved by tracking a change in the iris angle.

That is, after acquiring a gaze point location of the user at a first timing, the apparatus for processing an image in a VR system may determine a reference point position for a second region according to the gaze point location of the user at the first timing, and then automatically determine a first region and a second region according to a preset extension mode and the reference point position.

For example, as shown in FIG. 6, assume that point A is obtained as a gaze point location of the user at a first timing, the apparatus for processing an image in a VR system may use point A as a reference point of a second region, i.e., the point A is used as a central point, and a region within the preset range from the gaze point A is determined as a second region (region of interest), and the other region is determined as a first region (region of non-interest). Referring to FIG. 6, the split first region (region of non-interest) is a rectangle region, and the second region (region of interest) is a square region.

It should be noted that, in this embodiment, in addition to the shapes shown in FIG. 6, the first region (region of non-interest) and the second region (region of interest) obtained by splitting a current image to be rendered may be in other shapes, such as circle, etc., which is not limited herein.

As known from above, in the embodiment of the present application, an image to be rendered can be split into regions based on a current field of view of the user or optical characteristics of the VR system. As shown in FIG. 7, splitting an image to be rendered at a first timing in the VR system into a first region and a second region according to an embodiment of the present application comprises the following steps.

At step 701, when a vertical synchronization signal corresponding to an image to be rendered at a first timing is acquired, a location of the current gaze point of a user is determined.

At step 702, a field of view of the user is determined according to a distance between the location of the current gaze point of the user and a current location of the user.

At step 703, a second region is determined according to the field of view of the user and the current gaze point location.

In actual use, since the field of view is different when a user looks at the same point in different locations, the content viewed by the user is different. For example, for a user only looking at a table in the space, the field of view is smaller if the user is far from the table, and it will become larger when the user approaches the table. As a result, the area of the corresponding second region will become larger. Therefore, in the embodiment of the present application, firstly, a field of view of the user is determined according to a current location of the user and a distance between the current location of the user and a current gaze point of the user. Then, an image to be rendered is split according to the field of view and the gaze point location of the user. Thereby, the accuracy of region division is increased, and the image display effect can be improved.

As shown in FIG. 4, the method for processing an image in a VR system of this embodiment of the present application comprises the following steps. At step 402, a first region of an image to be rendered is rendered according to first gesture data at a first timing.

At step 403, a second region of the image to be rendered is rendered according to second gesture data at a second timing at the end of the rendering of the first region.

According to the apparatus for processing an image in a VR system of this embodiment, when a second region (region of interest) of the image to be rendered is rendered, a change from a gaze point location of the user at a first gesture to a gaze point location of the user at a second timing should be in a certain range; otherwise the result of region division will be different if region division is preformed on the image to be rendered based on a gaze point location at different timing, thereby there is an error in the image obtained by rendering the second region (region of interest) divided based on a gaze point at the first timing by using second gesture data of the user collected at the second timing, which will reduce the user experience to a certain extent.

Therefore, in this embodiment, when the second region (region of interest) of an image to be rendered is rendered according to second gesture data of the user, a gaze point location of the user at the second timing may be detected to ensure that when the first region (region of non-interest) and the second region (region of interest) of the image to be rendered are rendered, the change in the gaze point location of the user is within an allowable range, so as to further improve the user experience.

In some examples, a change in the gaze point location of the user may be determined to be within an allowable range in the following ways.

An example way may comprise: determining that a duration of rendering of the first region (region of interest) is less than a first threshold. The first threshold can be set based on persistence of vision.

In practical applications, in the case of observing a scene with human eyes, it takes a short time for a light signal to be conveyed to the brain nerves. After the end of the effect of light, a visual image does not disappear immediately. This residual vision is called "post-image", and this phenomenon of vision is called "persistence of vision". The phenomenon of persistence of vision is the phenomenon that a visual image produced by light on the retina remains for a short period after the effect of light disappears.

That is, after the first region (region of non-interest) of the image to be rendered is rendered according to first gesture data of the user at the first timing and when the second region (region of interest) of the image to be rendered is rendered according to second gesture data of the user at the second timing, if the duration of rendering the first region (region of non-interest) is less than visual persistence of the user, the gaze point of the user hardly changes when rendering the second region (region of interest) of the image to be rendered. In this case, the apparatus for processing an image in the VR system may render the second region (region of interest) of the image to be rendered according to the second gesture data of the user collected at the second timing.

Another exemplary way may comprise, for example, determining that a distance between a gaze point location corresponding to the second gesture data and a gaze point location at the first timing is less than a second threshold. The second threshold may be set according to the size of the first region (region of non-interest) split from the image to be rendered. In this embodiment, the second threshold may be a specific value or a range of values, which is not specifically limited herein.

In some embodiments, after the first region (region of non-interest) of the image to be rendered is rendered according to first gesture data of the user at a first timing, if it is determined that the gaze point location corresponding to second gesture data of the user at a second timing changes relative to gaze point location corresponding to the first gesture data, the gaze point location corresponding to the first gesture data may be compared with the gaze point location corresponding to the second gesture data to obtain a distance between the gaze point locations corresponding to the two different timings. Then, the distance is matched with a second threshold. If the distance is less than the second threshold, the change in the gaze point locations corresponding to the two different timings is considered to be in an allowable range, and the apparatus for processing an image in a VR system may render the second region (region of interest) of the image to be rendered according to the second gesture data of the user collected at the second timing.

In the method for processing an image in a VR system provided in this embodiment of the present application, an image to be rendered at a first timing in the VR system is split into a first region and a second region; the first region of the image to be rendered is rendered according to first gesture data at the first timing; and the second region of the image to be rendered is rendered according to second gesture data at a second timing at the end of the rendering of the first region to obtain a rendered image. Therefore, by using gesture data at different timings, time-division rendering is performed on different regions of the image to obtain a rendered image. Therefore, the time interval between a timing at which the rendered image is displayed and a timing at which the gesture data is collected for rendering is shortened as much as possible, which effectively reduces the delay of the image. Since the second region which is a region of interest or a subject region is closer in time to the display timing, and the first region is a region of non-interest or a background region, the delay has little effect on the user, thereby improving the user experience.

As known from above, in the embodiment of the present application, an image to be rendered is split into a first region and a second region; the first region is rendered according to first gesture data of the user at a first timing; and the second region is rendered according to second gesture data of the user at a second timing to obtain a rendered image.

In actual use, in order to further reduce the delay of the image, in an embodiment of the present application, a TimeWarp process may be further performed on an image corresponding to the first region as rendered and an image corresponding to the second region as rendered after rendering the first region of the image to be rendered. A method for processing an image in a VR system according to an embodiment of the present application will be described with reference to FIG. 8.

Figure 8:
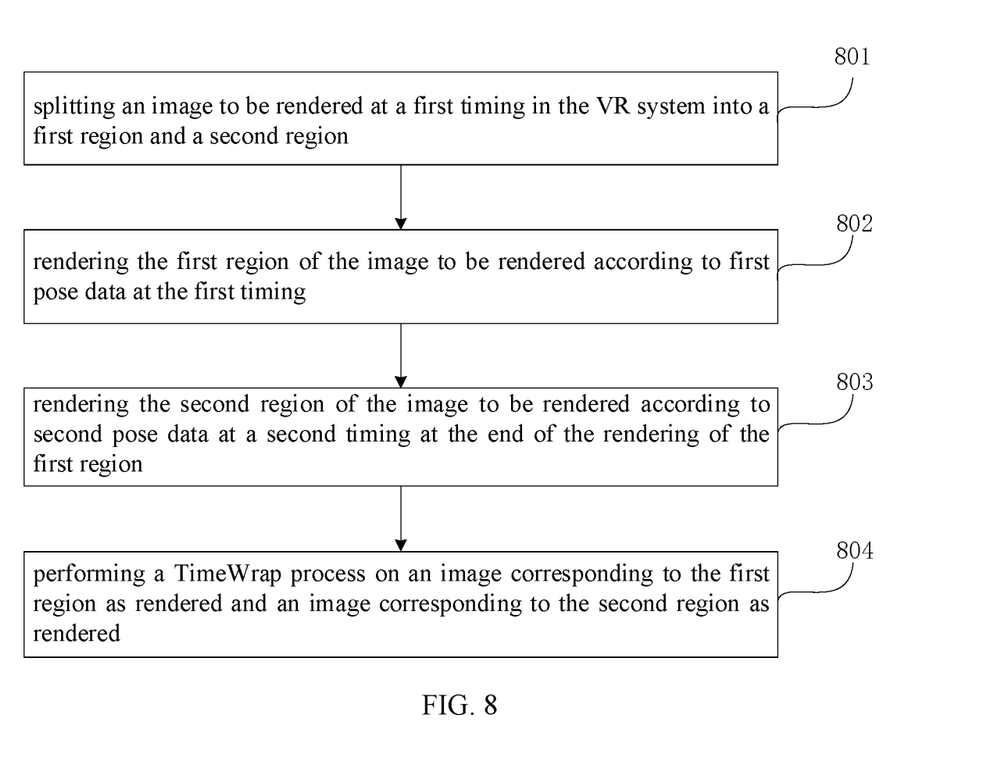
FIG. 8 is a schematic flowchart of a method for processing an image in a virtual reality system according to a further embodiment of the present application.

FIG. 8 is a schematic flowchart of a method for processing an image in a VR system according to a further embodiment of the present application.

As shown in FIG. 8, the method for processing an image in a VR system according to this embodiment of the present application comprises the following steps.

At step 801, an image to be rendered at a first timing in the VR system is split into a first region and a second region.

At step 802, the first region of the image to be rendered is rendered according to first gesture data at the first timing.

At step 803, the second region of the image to be rendered is rendered according to second gesture data at a second timing at the end of the rendering of the first region.

For the implementation process and the principle of steps 801-803, reference can be made to the detailed description of the foregoing embodiments, which will not be described herein.

At step 804, a TimeWarp (TW) process is performed on an image corresponding to the first region as rendered and an image corresponding to the second region as rendered.

The TW process is a technique for image frame correction. In the case of using a VR device, there is a delay in scene rendering due to the fast movement of the user's head, that is, it has no time to render an image corresponding to a certain location when the user turns his/her head to the location, or only a previous image frame can be rendered. TW processing is used to solve the delay problem by wrapping an image frame before sending it to the display.

The TW processing in this solution may be a direction-based TW process, which only corrects a change in the rotational gesture of the head. Thus, it does not need too much system resources to combine a deformed image through the above processing. For a complex scene, a new image can also be obtained with less calculation.

A method for processing an image in a VR system according to an embodiment of the present application will be described with reference to FIGS. 9 and 10.

Figure 9:
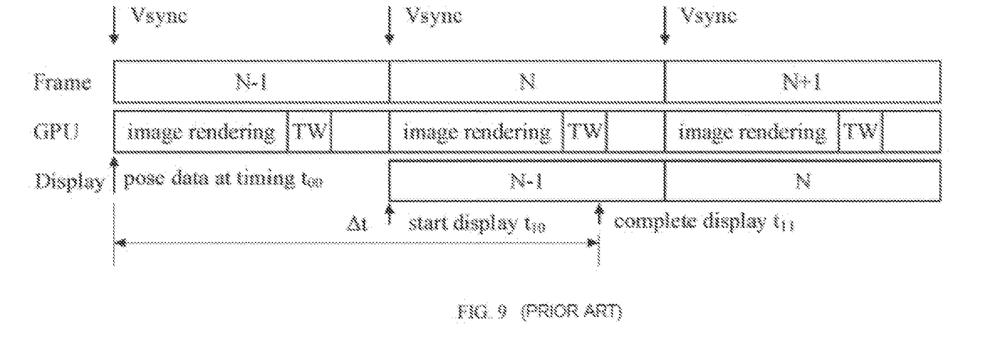
FIG. 9 is a schematic diagram of a process of rendering and displaying an image to be rendered in the related art.

FIG. 9 is a process of rendering and displaying an image to be rendered in the related art. Referring to FIG. 9, when the apparatus for processing an image in a VR system detects the vertical synchronization (Vsync) signal of the N-1th frame, that is, the first Vsync signal in the figure, it can render the N-1 frame while controlling to start the displaying of the N-2th frame (not shown). When rendering the N-1th frame, first, gesture data at timing t00 (that is, the timing of the first Vsync signal) is acquired, and the N-1th frame is rendered with this gesture data. At the end of the rendering of the N-1th frame, TimeWarp processing (i.e., TW processing) is performed on the N-1th frame. When a second Vsync signal is detected, the apparatus controls to start the displaying of the N-1th frame until the displaying is completed (for example, $t_{11}$). In addition, when the second Vsync signal is detected, rendering of the Nth frame is started, and so on. According to FIG. 9, in the entire process from rendering the N-1 frame to displaying its image above, the delay in the VR system is: $\Delta t = t_{11} - t_{00}$, that is, the image displayed on the system is an image that is rendered with gesture data at timing $t_{00}$ which is $\Delta t = t_{11} - t_{00}$ before timing $t_{11}$. However, the human body has changed from the first gesture at timing $t_{00}$ to the third gesture at timing $t_{11}$. Due to the system delay, human discomfort is caused by viewing, at the third gesture timing, an image that should be displayed at the first gesture timing.

It should be noted that the time interval from the start of displaying a frame to the completion of display of the frame in the figure is determined by the screen refresh frequency, which is generally an interval for data writing on the display screen and is less than the actual refresh time of one frame. That is, the interval from $t_{10}$ to $t_{11}$ is less than the time interval between two vertical synchronization signals.

Figure 10:
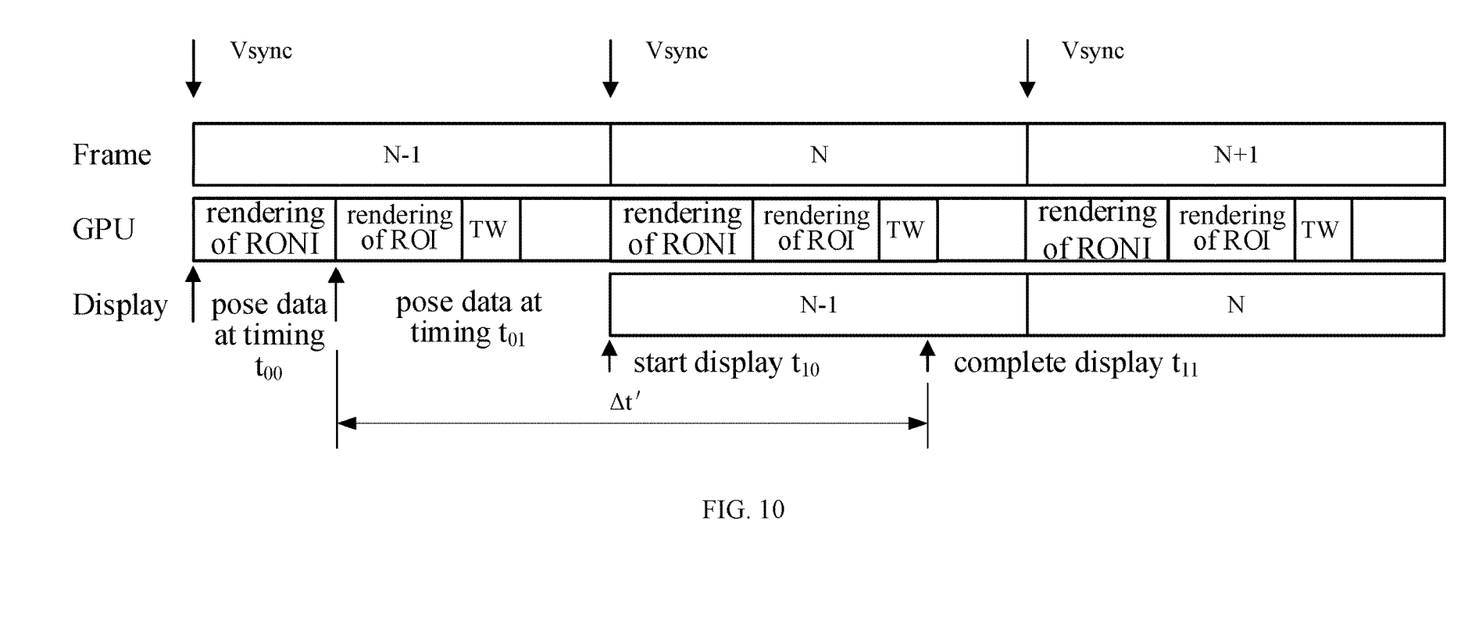
FIG. 10 is a schematic diagram of a process of rendering and displaying an image to be rendered according to an embodiment of the present application.

In order to reduce the delay of the VR system from the rendering process to the completion of the screen display, the process of rendering and displaying an image to be rendered in the embodiment of the present application is shown in FIG. 10. Referring to FIG. 10, when the apparatus for processing an image in a VR system detects the vertical synchronization (Vsync) signal of the N-1th frame, that is, the first Vsync signal in the figure, it can render the N-1 frame while controlling to start the displaying of the N-2th frame (not shown). When rendering the N-1th frame, first, an eye gaze point location at the first timing (corresponding to a first gesture) is obtained by eyeball tracking, and the N-1th frame is automatically split into a first region (region of non-interest, RONI) and a second region (region of interest, ROI) according to the gaze point location. Then, gesture data (first gesture) at timing $t_{00}$ (the timing at which the first Vsync signal is obtained) is obtained, which is then used to render a region of non-interest of the N-1th frame. At the end of the rendering of the region of non-interest of the N-1th frame, gesture data (second gesture) at timing $t_{01}$ (a timing at which the rendering of the region of non-interest of the N-1th frame ends), which is then used to render a region of interest of the N-1th frame. When the rendering of the N-1th frame is completed, TW processing is performed on an image corresponding to the region of non-interest as rendered and an image corresponding to the region of interest as rendered. Then, at the timing of the second Vsync signal, the apparatus controls to start the display of the N-1th frame until the completion of the display (for example, $t_{11}$). In addition, at the timing of the second Vsync signal, the apparatus starts the rendering of the Nth frame, and so on. According to FIG. 10, in the entire process from rendering the N-1 frame to displaying its image of this embodiment, the delay in the VR system is: $\Delta t' = t_{11} - t_{01}$, that is, the image displayed on the system is an image that is rendered with gesture data at timing $t_{00}$ which is $\Delta t' = t_{11} - t_{01}$ before $t_{11}$.

Through comparing the delay in the entire process from rendering an image to be rendered to displaying the rendered image in the VR system of the embodiment of the present application with the delay in the entire process from rendering an image to be rendered to displaying the rendered image in the VR system of the related art, it can be seen that the embodiment of the present application can reduce the delay in the entire process from rendering an image to be rendered to displaying the rendered image in the VR system by an amount of: $T=\Delta t'-\Delta t=(t_{11}-t_{01})-(t_{11}-t_{00})=t_{00}-t_{01}$.

Thus, through performing an image to be rendered with the method for processing an image in a VR system of the embodiment of the present application, compared with the method for processing an image to be rendered in the related art, the delay of image display can be further reduced, so that the displayed image is matched with the movement of the user better, the demand of the user can be satisfied, and the user experience can be improved. Moreover, in the embodiment of the present application, the image to be rendered is split into a region of interest and a region of non-interest to perform time-division rendering on the region of interest and the region of non-interest with gesture data at different timings in the rendering of the region of interest and the region of non-interest. Therefore, the time interval between a timing at which the rendered image is displayed and a timing at which the gesture data is collected for rendering is shortened as much as possible, which effectively reduces the delay of the image. In addition, since the region of interest is closer in time to the display timing, and the region of non-interest does not have a significant impact on the viewing of the user, the user experience can be improved.

Figure 11:
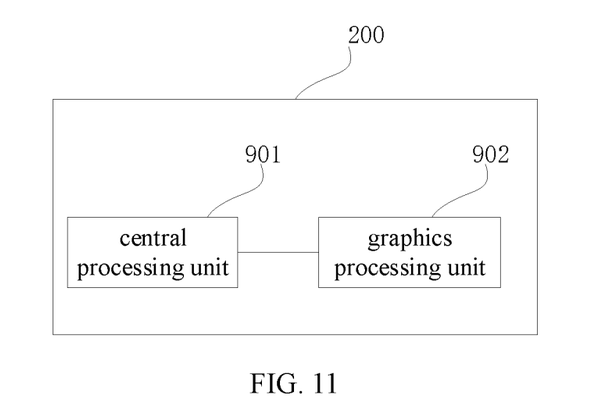
FIG. 11 is a schematic structural diagram of an apparatus for processing an image in a virtual reality system according to an embodiment of the present application.

An apparatus for processing an image in a VR system is further provided in the present application. FIG. 11 is a schematic structural diagram of an apparatus for processing an image in a virtual reality system according to an embodiment of the present application.

As shown in FIG. 11, the apparatus for processing an image in a VR system of this embodiment of the present application comprises: a central processing unit (CPU) 901 and a graphics processing unit (GPU) 902.

The central processing unit is configured to split an image to be rendered at a first timing in the virtual reality system into a first region and a second region.

The graphics processing unit 902 is configured to, according to first gesture data of a user at a first timing, render the first region of the image to be rendered.

The graphics processing unit 902 is further configured to, according to second gesture data of the user at a second timing at the end of the rendering of the first region, render the second region of the image to be rendered.

The gesture data of the user can be obtained by a somatosensory recognition component in the VR system.

The somatosensory recognition component comprises at least one of: a gyroscope, a gravity sensor, a magnetic sensor, an infrared sensor, etc.

As an implementation of the present application, the first timing is a timing when a vertical synchronization signal is generated in the VR system.

As an implementation of the present application, the GPU 902 is further configured to: perform a TimeWarp process on an image corresponding to the first region as rendered and an image corresponding to the second region as rendered.

As an implementation of the present application, the GPU 902 is further configured to: render the first region with a first resolution; render the second region with a second resolution; wherein, the first resolution is lower than the second resolution.

As an implementation of the present application, the CPU 901 is configured to: perform subject recognition on the image to be rendered at the first timing to determine a region in the image to be rendered at which a subject is located; determine the region in the image to be rendered at which the subject is located as the second region.

As an implementation of the present application, the CPU 901 is configured to: determine a gaze point location of the user at the first timing as a reference point position of the second region; determine the second region according to a preset extension mode and the reference point position.

As an implementation of the present application, the CPU 901 is configured to: determine a field of view of the user according to a distance between a current gaze point location of the user and a current location of the user; determine the second region according to the field of view of the user and the current gaze point location.

As an optional implementation of the present application, the CPU 901 is further configured to: determine that a duration of rendering of the first region is less than a first threshold; or determine that a distance between a gaze point location corresponding to the second gesture data and a gaze point location at the first timing is less than a second threshold.

Figure 12:
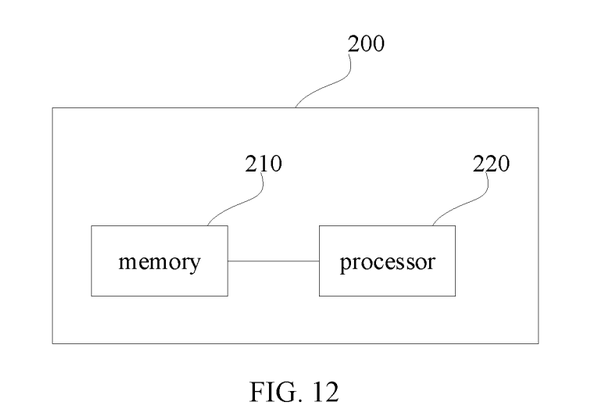
FIG. 12 is a schematic structural diagram of an apparatus for processing an image in a virtual reality system according to another embodiment of the present application.

As shown in FIG. 12, in another embodiment of the present application, the apparatus 200 for processing an image in a VR system further comprises: memory 210 and a processor 220. Wherein, a computer program is stored in the memory 210; when the computer program stored in the memory 210 is invoked and executed by the processor 220, it implements the method for processing an image in a VR system according to the first embodiment of the present application.

Figure 13:
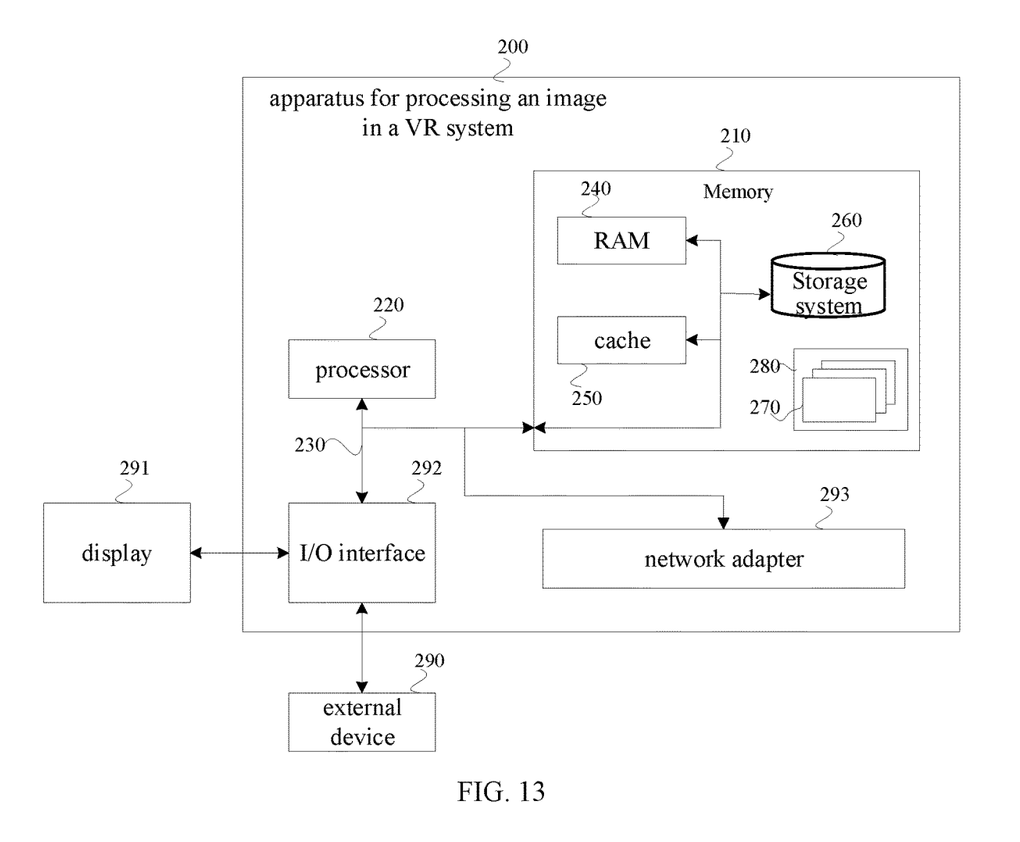
FIG. 13 is a schematic structural diagram of an apparatus for processing an image in a virtual reality system according to a further embodiment of the present application.

In an optional implementation, as shown in FIG. 13, the apparatus 200 for processing an image in a VR system may further include: memory 210 and a processor 220, and a bus 230 connecting different components (including the memory 210 and the processor 220), a computer program stored on the memory 210, which when executed by the processor 220 implements method for processing an image in a VR system according to the first embodiment of the present application.

The bus 230 represents one or more of several types of bus structures, including a memory bus or memory controller, a peripheral bus, a graphics acceleration port, a processor, or a local bus using any of a variety of bus structures. For example, these architectures include, but are not limited to, an Industry Standard Architecture (ISA) bus, a Micro Channel Architecture (MAC) bus, an Enhanced ISA Bus, a Video Electronics Standards Association (VESA) local bus, and peripheral component interconnects (PCI) bus.

The computer device 200 typically includes a variety of computer device readable media. These media can be any available media that can be accessed by computer device 200, including both volatile and nonvolatile media, removable and non-removable media.

The memory 210 may also include computer system readable media in the form of volatile memory, such as random access memory (RAM) 240 and/or cache memory 250. The computer device 200 may further include other removable/non-removable, volatile/non-volatile computer system storage media. By way of example, a storage system 260 can be used to read from and write to non-removable, non-volatile magnetic media (not shown in FIG. 13, generally referred to as "hard disk drives"). Although not shown in FIG. 13, a magnetic disk driver for reading from and writing to a removable non-volatile disk (such as a "floppy disk"), and an optical disk driver for reading from and writing to a removable non-volatile optical disk (such as a CD-ROM, DVD-ROM, or other optical media) may be provided. In these cases, each driver can be coupled to the bus 230 via one or more data medium interfaces. The memory 210 can include at least one program product having a set (e.g., at least one) of program modules configured to perform the functions of the various embodiments of the present application.

A program/utility 280, having a set (at least one) of program modules 270, may be stored in the memory 210 by way of example, and not limitation, as well as an operating system, one or more application programs, other program modules, and program data. Each of the operating system, one or more application programs, other program modules, and program data or some combination thereof, may include an implementation of a networking environment. The program modules 270 generally carry out the functions and/or methodologies of embodiments of the present application as described herein.

The computer device 200 may also communicate with one or more external devices 290 such as a keyboard, a pointing device, a display 291, etc.; one or more devices that enable a consumer to interact with the computer device 200; and/or any devices (e.g., network card, modem, etc.) that enable the computer device 200 to communicate with one or more other computing devices. Such communication can occur via I/O interfaces 292. Still yet, the computer device 12 can communicate with one or more networks such as a local area network (LAN), a general wide area network (WAN), and/or a public network (e.g., the Internet) via a network adapter 293. As depicted, the network adapter 293 communicates with the other components of the computer device 200 via the bus 230. It should be understood that although not shown, other hardware and/or software components could be used in conjunction with the computer device 200. Examples include, but are not limited to: microcode, device drivers, redundant processing units, external disk drive arrays, RAID systems, tape drives, and data archival storage systems, etc.

It should be noted that the foregoing explanation of the embodiment of the method for processing an image in a VR system is also applicable to the apparatus for processing an image in a VR system of this embodiment, the implementation principle thereof is similar, and will not be described in detail herein.

In the apparatus for processing an image in a VR system provided in this embodiment of the present application, an image to be rendered at a first timing in the VR system is split into a first region and a second region; the first region of the image to be rendered is rendered according to first gesture data at the first timing; and the second region of the image to be rendered is rendered according to second gesture data at a second timing at the end of the rendering of the first region to obtain a rendered image. Therefore, by using gesture data at different timings, time-division rendering is performed on different regions of the image to obtain a rendered image. Therefore, the time interval between a timing at which the rendered image is displayed and a timing at which the gesture data is collected for rendering is shortened as much as possible, which effectively reduces the delay of the image and improves the user experience.

The present application further provides a computer-readable medium. The computer-readable storage medium has a computer program stored thereon, which when executed by a processor, implements the method for processing an image in a VR system according to the first embodiment of the present application.

In an optional implementation, this embodiment can employ any combination of one or more computer readable media. The computer readable medium can be a computer readable signal medium or a computer readable storage medium. The computer readable storage medium can be, for example, but not limited to, an electronic, magnetic, optical, electromagnetic, infrared, or semiconductor system, apparatus, or device, or any combination of the above. More specific examples (non-exhaustive lists) of computer readable storage medium include: electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing. In this document, a computer readable storage medium can be any tangible medium that can contain or store a program, which can be used by or in connection with an instruction execution system, apparatus or device.

A computer readable signal medium may include a data signal that is propagated in the baseband or as part of a carrier, carrying computer readable program code. Such propagated data signals can take a variety of forms including, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device.

Program code embodied on a computer readable medium can be transmitted by any suitable medium, including but not limited to wireless, wire, fiber optic cable, RF, etc., or any suitable combination of the foregoing.

The computer program code for executing operations of the present application may be complied by any combination of one or more program design languages, the program design languages including object-oriented program design languages, such as Java, Smalltalk, C++, etc, as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the latter circumstance, the remote computer may be connected to the user computer through various kinds of networks, including local area network (LAN) or wide area network (WAN), or connected to external computer (for example using an internet service provider via Internet).

The present application further provides a computer program. When executed by a processor, the computer program implements the method for processing an image in a VR system according to the first embodiment of the present application.

In the present application, the terms "set", "connection" and the like should be interpreted broadly, for example, a connection may be a mechanical connection or electrical connection, unless otherwise explicitly stated and defined; it may be direct connection or indirect connection through an intermediate medium, and may be internal communication of two elements or an interaction relationship of two elements, unless explicitly defined otherwise. For those of ordinary skill in the art, the specific meanings of the above terms in this application can be interpreted according to particular situations.

In the description of this specification, reference throughout this specification to "one embodiment", "some embodiments", "illustrative embodiments", "examples", "specific examples", or "some examples" means that a particular feature, structure, material or characteristic described in connection with the embodiment is included in at least one embodiment of the present application.

Furthermore, the terms "first" and "second" are used for descriptive purposes only, and are not to be construed as indicating or implying relative importance or implicitly indicating the number of indicated technical features. Thereby, features defined by "first", "second" may expressly or implicitly include one or more of the features.

Any process or method description in the flowcharts or otherwise described herein may be interpreted as representing a module, segment or portion of code that includes one or more executable instructions for implementing the steps of a particular logical function or process. And the scope of the preferred embodiments of the present application includes additional implementations, in which the functions may not be performed in the order shown or discussed, including in a substantially simultaneous manner or in an opposite order depending on the functions involved, as understood by those skilled in the art to which the embodiments of the present application belong.

It should be understood that portions of the present application can be implemented in hardware, software, firmware, or a combination thereof. In the above-described embodiments, multiple steps or methods may be implemented in software or firmware stored in a memory and executed by a suitable instruction execution system. For example, if implemented in hardware, as in another embodiment, it can be implemented with any one or a combination of the following technologies, which are each well known in the art: a discrete logic circuit(s) having logic gates for implementing logic functions upon data signals, an application specific integrated circuit having appropriate combinational logic gates, a programmable gate array(s) (PGA), a field programmable gate array (FPGA), etc.

The common technical personnel in the field can understand that all or some steps in the embodiments can be completed by the means that relevant hardware is instructed by a program, the program can be stored in a computer readable storage medium, and the program comprises any one or combination of the steps in the embodiments when being executed.

The above mentioned storage medium may be a read only memory, a magnetic disk or an optical disk, etc. Although embodiments of the present disclosure have been illustrated and described above, it will be understood that the above-described embodiments are exemplary and not to be construed as limiting the present application. Those of ordinary skill in the art may make variations, modifications, substitutions, and variations to the above described embodiments within the scope of the present application.

What is claimed is:

1. A method for processing an image in a virtual reality system, comprising:
   splitting an image to be rendered at a first timing in the virtual reality system into a first region and a second region by determining a gaze point location of the user at the first timing as a reference point position of the second region, determining the second region according to a preset extension mode and the reference point position, determining a field of view of the user according to a distance between a current gaze point location of the user and a current location of the user, and determining the second region according to the field of view of the user and the current gaze point location;
   rendering the first region of the image to be rendered according to first gesture data of a user at the first timing;
   rendering the second region of the image to be rendered according to second gesture data at a second timing at an end of the rendering of the first region; and
   before rendering the second region of the image to be rendered, determining that a
   distance between a gaze point location corresponding to the second gesture data and the gaze point location at the first timing is less than a threshold.

2. The method according to claim 1, wherein the first timing is a timing at which a vertical sync signal is generated in the virtual reality system.

3. The method according to claim 1, further comprising:
   after rendering the second region of the image to be rendered, performing a TimeWarp process on an image corresponding to the first region as rendered and an image corresponding to the second region as rendered.

4. The method according to claim 3, wherein splitting the image to be rendered at the first timing in the virtual reality system into the first region and the second region comprises:
   performing subject recognition on the image to be rendered at the first timing to determine a region in the image to be rendered at which a subject is located; and
   determining the region in the image to be rendered at which the subject is located as the second region.

5. The method according to claim 3, wherein splitting the image to be rendered at the first timing in the virtual reality system into the first region and the second region comprises:
   determining a gaze point location of the user at the first timing as a reference point position of the second region; and
   determining the second region according to a preset extension mode and the reference point position.

6. The method according to claim 1, wherein:
   rendering the first region of the image to be rendered comprises rendering the first region with a first resolution;
   rendering the second region of the image to be rendered comprises rendering the second region with a second resolution; and
   the first resolution is lower than the second resolution.

7. The method according to claim 1, wherein splitting an image to be rendered at a first timing in the virtual reality system into a first region and a second region comprises:
   performing subject recognition on the image to be rendered at the first timing to determine a region in the image to be rendered at which a subject is located; and
   determining the region in the image to be rendered at which the subject is located as the second region.

8. An apparatus for processing an image in a virtual reality system, comprising:
   a central processing unit configured to split an image to be rendered at a first timing in the virtual reality system into a first region and a second region by determining a gaze point location of the user at the first timing as a reference point position of the second region, determining the second region according to a preset extension mode and the reference point position, determining a field of view of the user according to a distance between a current gaze point location of the user and a current location of the user, and determining the second region according to the field of view of the user and the current gaze point location; and
   a graphics processing unit configured to:

render the first region of the image to be rendered according to first gesture data of a user at the first timing;
render the second region of the image to be rendered according to second gesture data at a second timing at an end of the rendering of the first region; and
before rendering the second region of the image to be rendered, determine that a
distance between a gaze point location corresponding to the second gesture data and the gaze point location at the first timing is less than a threshold.

9. The apparatus according to claim 8, wherein the graphics processing unit is further configured to:
perform a TimeWarp process on an image corresponding to the first region as rendered and an image corresponding to the second region as rendered after rendering the second region of the image to be rendered.

10. The apparatus according to claim 8, wherein:
in order to render the first region of the image to be rendered, the graphics processing unit is configured to render the first region with a first resolution;
in order to render the second region of the image to be rendered, the graphics processing unit is further configured to render the second region with a second resolution; and
the first resolution is lower than the second resolution.

11. The apparatus according to claim 8, wherein in order to split the image to be rendered at the first timing in the virtual reality system into the first region and the second region, the central processing unit is further configured to:
perform subject recognition on the image to be rendered at the first timing to determine a region in the image to be rendered at which a subject is located; and
determine the region in the image to be rendered at which the subject is located as the second region.

12. A non-transitory computer-readable storage medium on which a computer program is stored, which when executed by a processor caused the processor to:
split an image to be rendered at a first timing in the virtual reality system into a first region and a second region by determining a gaze point location of the user at the first timing as a reference point position of the second region, determining the second region according to a preset extension mode and the reference point position, determining a field of view of the user according to a distance between a current gaze point location of the user and a current location of the user, and determining the second region according to the field of view of the user and the current gaze point location;
render the first region of the image to be rendered according to first gesture data of a user at the first timing;
render the second region of the image to be rendered according to second gesture data at a second timing at an end of the rendering of the first region; and
before rendering the second region of the image to be rendered, determine that a
distance between a gaze point location corresponding to the second gesture data and the gaze point location at the first timing is less than a threshold.

* * * * *